United States Patent
Zucker

(10) Patent No.: US 11,226,681 B2
(45) Date of Patent: Jan. 18, 2022

(54) GAZE-BASED HUMAN INTERFACE CONTROLS

(71) Applicant: NCR Corporation, Atlanta, GA (US)

(72) Inventor: Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/775,797

(22) Filed: Jan. 29, 2020

(65) Prior Publication Data

US 2021/0232218 A1  Jul. 29, 2021

(51) Int. Cl.
   *G06F 3/01* (2006.01)
   *G06F 3/0482* (2013.01)
   *G06T 7/20* (2017.01)
   *G06F 3/0484* (2013.01)

(52) U.S. Cl.
   CPC .............. *G06F 3/013* (2013.01); *G06F 3/017* (2013.01); *G06F 3/0482* (2013.01); *G06F 3/0484* (2013.01); *G06T 7/20* (2013.01); *G06T 2207/30201* (2013.01)

(58) Field of Classification Search
   CPC ........ G06F 3/013; G06F 3/017; G06F 3/0482; G06F 3/0484
   See application file for complete search history.

(56) References Cited

U.S. PATENT DOCUMENTS

| 2011/0004629 | A1* | 1/2011 | Thorat | H04L 41/084 707/783 |
| 2013/0300636 | A1* | 11/2013 | Cunningham | G06F 3/013 345/8 |
| 2019/0094958 | A1* | 3/2019 | Williams | G06F 3/017 |
| 2019/0107884 | A1* | 4/2019 | Williams | G06F 3/0481 |
| 2019/0235624 | A1* | 8/2019 | Goldberg | G06F 1/163 |
| 2020/0225741 | A1* | 7/2020 | Iyer | G02B 27/0093 |

* cited by examiner

*Primary Examiner* — David E Choi
(74) *Attorney, Agent, or Firm* — Schwegman, Lundberg & Woessner

(57) ABSTRACT

Eyes of an operator of a device are tracked with respect to an interface element of an interface presented on a display of the device. An interface operation that is directed to an interface element is determined based on a gaze of the eyes, a predefined movement of the eyes, and/or predefined movements of eyelids for the eye. The interface operation is processed on the interface element within the interface.

19 Claims, 4 Drawing Sheets

GAZE-BASED HUMAN INTERFACE CONTROLS

BACKGROUND

Interfaces to computer-based applications have become increasingly complex as more and more functionality and customizations are added. In fact, a poorly-designed interface can substantially decrease usability and can prevent users from fully and accurately taking advantage of the interface's underlying functionality, Many users will select a computer-based application solely based on the application's interface. In fact, users may forgo added functionality associated with one application and prefer a different application, which has a more intuitive and easier to operate interface.

Companies spend significant time and resources on their applications' interfaces for this reason, Often, companies have focus groups and beta releases of their interface before ever releasing a back-end application or a service to their customers.

Furthermore, some devices, such as phones, have extremely small displays, which make it very difficult to utilize the full functionality of an application accessible through the corresponding application interface. These devices are often operated by touch and selectable options are usually in close proximity to one another on the device's display, such that selection of an intended option can cause an adjacent and unintended option to be activated by the user.

One type of interface associated with transaction processing for checking out items can be particularly cumbersome and difficult to operate, especially by inexperienced consumers attempting to perform unassisted and self-service checkouts. Many times, these interfaces require the operator to manually enter item information and access other options to modify any manually-entered item or to modify any scanned-entered item. These interfaces have to account for a variety of complex situations, which can occur during the checkout process. Each complex situation is associated with one or more selected options, some of which may not immediately be visible to the operator without first selecting a different control through the checkout interface, which then presents a needed or desired option. Further, some interface issues are difficult if not impossible to avoid because of the limited amount of space available on the checkout display. Such issues may not be as pronounced for skilled and trained cashiers performing checkouts, but such issues are extremely problematic for consumers performing self-checkouts.

Additionally, even skilled cashiers struggle with checkout interfaces at times because the cashiers are trying to perform a variety of actions during a checkout, such as receiving coupons from a customer in one hand while scanning an item in another hand. Each time the cashier is required by the interface to select an interface option to enter information, the transaction is delayed, which can be of significant import when checkout station queues are long.

SUMMARY

In various embodiments, methods and a system for gaze-based human interface controls are presented.

According to an embodiment, a method for a gaze-based human interface control is presented. An image that depicts an individual and an item is received. Attributes associated with the individual and the item are obtained, and a determination is made as to whether, based on processing the image with the attributes, the individual is in possession of the item.

DETAILED DESCRIPTION

Figure 1:
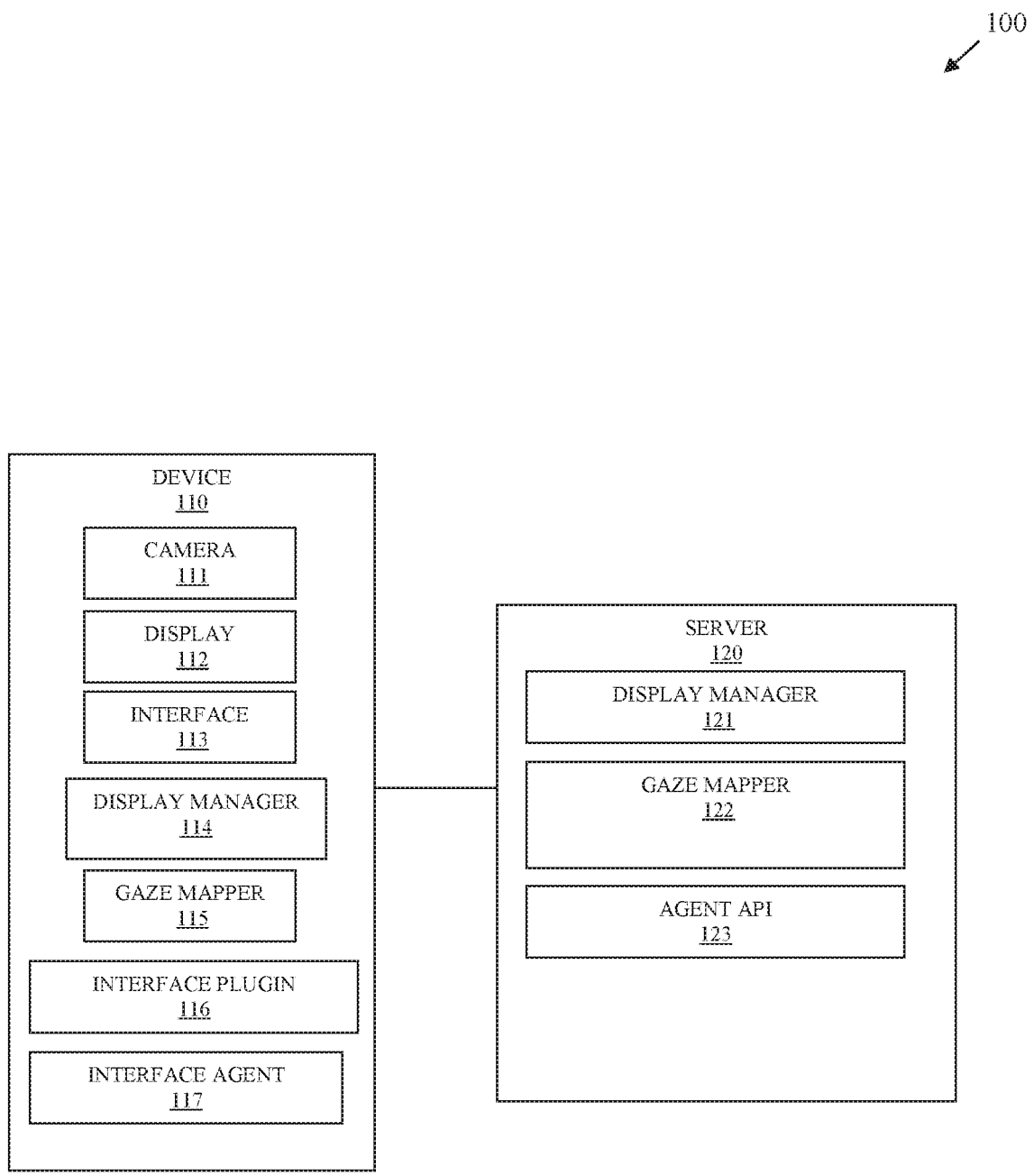
FIG. 1 is a diagram of a system for gaze-based human interface controls, according to an example embodiment.

FIG. 1 is a diagram of a system 100 for gaze-based human interface controls, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of gaze-based human interface controls, presented herein and below.

As used herein and below, the terms "customer," "consumer," and "user" may be used interchangeably and synonymously.

"Operator" refers to a consumer or an attendant/clerk that s operating a device having a user-facing interface.

"Gaze" refers to the direction, angle, and focus of eyes of an operator.

As will be discussed more completely herein and below, system 100 permits new and enhanced device interfaces that permit the eyes of an operator to service as a Human Interface Device (HID) that communicates with the underlying user-interface elements of a corresponding device interface through gazes and/or eyes-based commands (such as, blinking, looking left, looking right, looking up, looking down, squinting, closing one eyelid, closing both eyelids, and/or predefined combinations of these things). Essentially, focus and operation of an operator's eyes provides a logical HID for the interface of the device having a user-facing interface. Moreover, in some embodiments, an existing interface does not require modification for operation of eyes to provide input selections to the existing interface, as this can be achieved by translating the gazes and eyes into recognized HID inputs for a HID recognized and natively used for the existing interface.

The system 100 includes at least one camera 111, a display 112, a user-facing interface 113, a display manager 114, a gaze mapper 115, an interface plugin 116, and an interface agent 117. In some embodiments, system 100 further includes a server 120 comprising a display manager 121, a gaze mapper 122, and an agent Application Programming Interface (API). The device 110 and the server 120 include their own hardware processors and non-transitory computer-readable storage media comprising executable instructions. The executable instructions when executed by the corresponding processors from the corresponding non-transitory computer-readable storage medium causes that processor to perform the processing represented by user-facing interface 113, display manager 114, gaze mapper 115, interface plugin 116 interface agent 117, display manager 121, gaze mapper 122, and agent API 123.

It is to be noted that although not illustrated in the FIG. 1, both device 110 and server 120 include one or more hardware processors, volatile and non-volatile memory, non-volatile storage, and networking circuitry (such as wired ports and/or wireless transceivers).

It is also to be noted that there may be multiple servers, such that the different elements 121-123 may execute on a same server 120 or multiple different servers networked together within a cloud processing environment (cloud). Still further, server 120 may include a user-facing interface delivered over a network connection to device 110, such as is the case through a web browser-based interface, such that user-interface 113 may reside on server 120.

The system 100 may be operated in three manners. In the first manner, the gaze-based interface controls for a user interface 113 is processed entirely on device 110. In the second manner, the gaze-based interface controls for a user interface 113 is processed on device 110 and through operations of server 120. In a third manner, the gaze-based interface controls for a user interface 113 is processed on server 120 and through additional information provided and, in some cases, processed on device 110; but the user-interface 113 is rendered on display 112 to the operator. In each of the above-discussed embodiments, the user-interface is presented on display 112 of device 110 and is operated through gazes and eye-based commands by an operator of device 110.

Display managers 114 and/or 121 is responsible for identifying a type of display 112; identifying the displayable dimensions, length, and width of the displayable area of display 112, identifying a quality setting for pixels displayed on display 112, identifying a font size for displayed information on display 112, identifying other display settings set for display 112, identifying window identifiers for windows presented on the display 112 (since multiple separate windows may be presented on display 112 at a single time), and identifying sizes and starting pixel coordinates (such as topmost left corner coordinate pair) for each active window. Display manager 114 and/or 121 communicates this information to gaze mapper 115 and/or gaze mapper 122 (through agent 117). Display manager 114 also dynamically reports any changes made: in the display settings, by moved windows made by the operator, by deleted windows, and/or by newly-added windows, to the displayable information on display 112 to gaze mapper 114 and/or gaze mapper 122 (through agent 117). Display manager 114 and/or 121 (through agent 117) may obtain this information from the underlying Operating System (OS) of device 110, from the display device driver for display 112, and/or from the OS windows manager.

Camera 111 is integrated into device 110 or is interfaced to device 110. Camera 111 is pre-situated or configured to capture a face of an operator that operates device 110. Camera 111 captures video frames of the operator in real time in captured video.

Gaze mapper 115 and/or 122 (through agent 117) receives the video frames as a first set of inputted information during operation of device 110 when interface 113 is being processed on or from device 110. As stated above, gaze mapper 115 and/or 122 (through agent 122) also receives the information discussed above obtained and reported in real time from display manager 114 and/or 121 (through agent 117) as a second set of inputted information.

Gaze mapper 115 and/or 122 analyzes a distance and angle of the operator with respect to the display 110 based on locations of the operators eyes from the video frames. A direction of the eyes is also determined from the video frames. A pixel grid is maintained for pixel locations of the display 112 and utilized in combination with known topmost left coordinates for active displayed windows and the sizes of those windows. Additionally, gaze mapper 115 receives interface state information for interface 113. State information includes current interface elements and locations of those elements within that interface window. This state information and interface element location information is provided by interface plugin 117.

Interface plugin 116 may utilize an interface schema associated with interface 113 that receives current state or registers for receiving or detecting state of interface 113. Each state defines available interface elements associated with that state and locations of the interface elements relative to one another and size of each interface element relative to one another for a given state. The schema may also define by state expected or needed interface elements requiring input from an operator.

Gaze mapper 115 and/or 122 utilizes the state, interface elements, direction of eyes, angle of eyes relative to the display surface, and display manager provided information to determined what interface element the operator is currently looking at on the display 112 at any given point in time. Gaze mapper 115 and/or 122 also processes a set of predefined eye commands associated with movements of the operators eyes and/or eyelids. This can be any of the above-referenced eye commands. For example, a double blink is assumed to be an enter or submit command, a gaze or look downward away from the display is considered to be a back command. The commands may also define the length of a particular gaze. For example, a continuous gaze for 3 seconds is considered to be a select command. The eye commands may be dynamically evaluated from a file and mapped to specific interface commands for the given interface 113, such that it is customizable based on the specific interface 113 and/or user.

When a particular gaze (based on elapsed time of a held gaze) or eye command is mapped to a given interface element for the interface 113 in a given state (utilizing plugin 116) by mapper 115 and/or 122 and translated into a HID command recognized by interface 113 (such as a mouse-click command) and placed in the HID stack for the OS to be processed for interface 113. Alternatively, interface plugin 116 utilizes an API associated with interface 113 to directly execute the interface command for interface 113 with interface 113; mapper 115 and/or 122 provides the command for processing within interface 113 to plugin 116.

The eye commands processed by mapper 115 and/or 122 or plugin 116 by interface 113 can includes a variety of traditional window-based interface commands or interface-specific commands, such as paging and scrolling a given window when the eyes are fixated at the bottom of the window for a set amount of elapsed time (e.g., 2 seconds); staring or gazing at a menu option for a set amount of elapsed time processes a menu expansion option with all the menu options displayed within the interface 113, a single blink when staring at an option is processed as an option selection within the interface 113; staring at an input field can activate the interface to display input characters for selection by the user; etc.

It is noted that more complex eye commands may be used, as multiple interface selections, such as looking down and then blinking causes interface 113 to expand a menu and select the first menu option within the interface 113.

It is also noted that both gazes/stares and/or eye commands (as discussed above may be used).

System 100 permits gazes of an operator's eyes and/or eye and eyelid movements to activate interface elements of an interface 113. The eyes of the operator become a logical HID that enhances the interface 113. This can be done without modification to the underlying interface 113 through interface plugin 116.

In some cases, a new enhanced interface 113 is provided, which accounts for eye gazes and/or eye commands as a HID for that interface. In these embodiments, typical visually required interface elements such as page scroll, selections, menu drill downs to sub menu options may be removed from the interface itself as visually selected elements. This frees substantial space up within the interface for more complex interface elements and is particularly useful for devices with small display screens, such as mobile phones, watches, tablets, and other devices with small displays. This is also useful for Point-Of-Sale (POS) and Self-Service Terminal (SST) interfaces that often require a substantial amount of interface elements and options by eliminating visual options for command and yet needed interface elements and replacing such options with gaze and eye-based commands.

In an embodiment, the device 110 is a drive-thru display that a customer can access through gazes and eye commands while seated in his/her vehicle.

In an embodiment, the device 110 is a mobile phone, television, tablet, or wearable processing device.

In an embodiment, the device 110 is an SST, Automated Teller Machine (ATM), POS terminal, kiosk, or self-checkout terminal.

In an embodiment, the gaze and eye-based control of the interface 113 is processed through video passed from device 110 to server 120. In an embodiment, gaze mapper 115 may still be processed to identify the direction and angle of the operator's eyes, which is then communicated by agent 117; in this embodiment video may not be required to be sent over a network to server 120.

In an embodiment, gaze mapper 115 and/or 122 may be a trained machine-learning algorithm trained to receive as input video, and interface schema for an interface 113, and the information provided by display manager 114 and/or 121 and output a specific interface element selection or interface command for that interface 113.

In an embodiment, gaze mapper 115 and/or 122 is a combination of a trained machine-learning algorithm and the processing discussed above for mapper 115 and/or 122.

It is noted that both eye gazes and/or eye commands may be processed as selections of interface elements of an interface 113 to control that interface via the operated eyes as a HID for the interface 113. This can be used with existing and unmodified interfaces 113 or in newly enhanced interfaces 113 where common and repetitive interface commands are removed from the visual display elements of that interface 113 and replaced with gaze and/or eye-based commands of the operator.

These and other embodiments are now discussed with reference to FIGS. 2-4.

Figure 2:
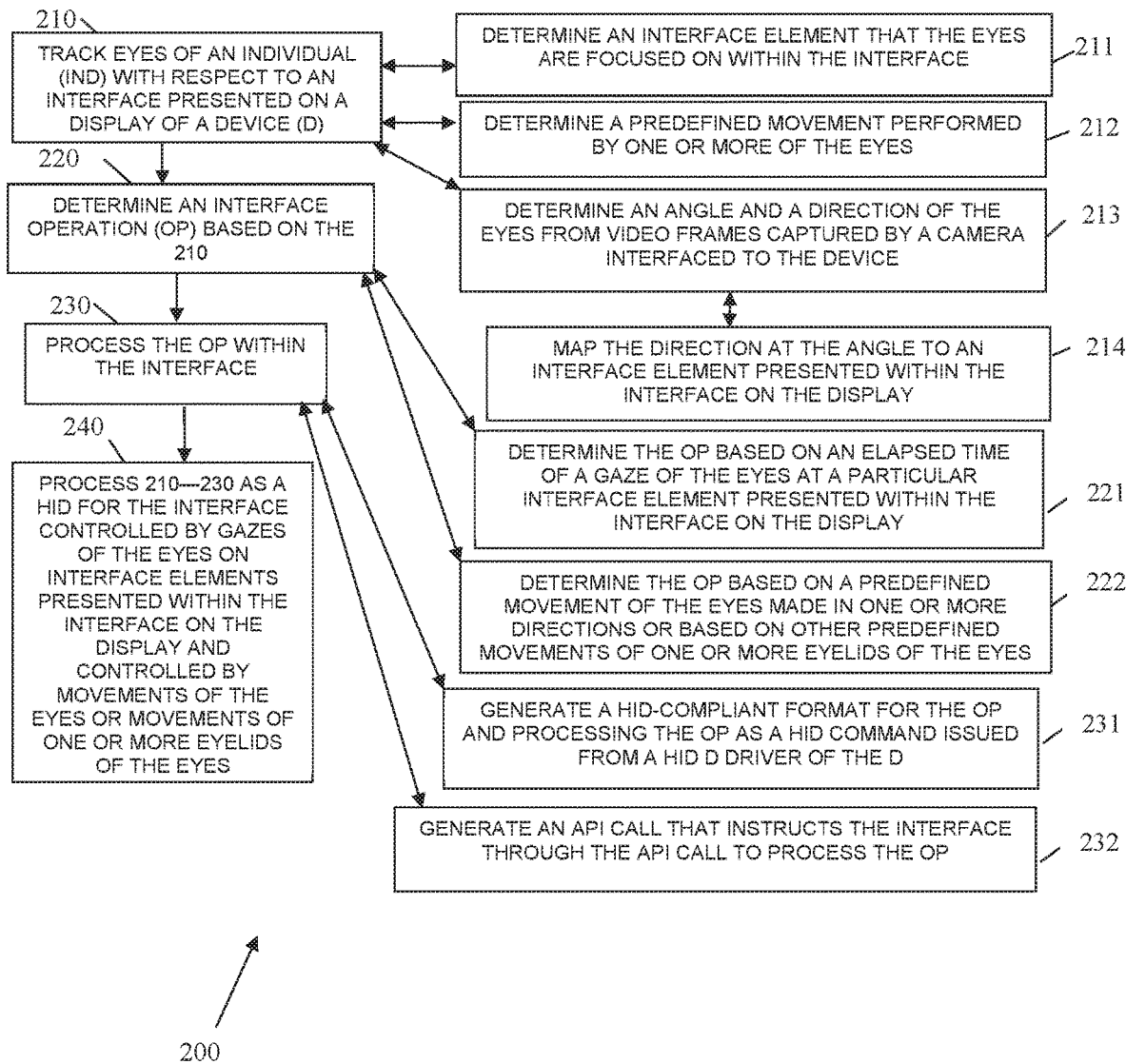
FIG. 2 is a diagram of a method for a gaze-based human interface control, according to an example embodiment.

FIG. 2 is a diagram of a method 200 a gaze-based human interface control, according to an example embodiment. The software module(s) that implements the method 200 is referred to as an "eye-controlled interface manager." The eye-controlled interface manager is implemented as executable instructions programmed and residing within memory and/or a non-transitory computer-readable (processor-readable) storage medium and executed by one or more processors of a device. The processor(s) of the device that executes the eye-controlled interface manager are specifically configured and programmed to process the eye-controlled interface manager. The eye-controlled interface manager has access to one or more network connections during its processing. The network connections can be wired, wireless, or a combination of wired and wireless.

In an embodiment, the device that executes the eye-controlled interface manager is the server 120. In an embodiment, the server 120 is a cloud-based server.

In an embodiment, the device that executes the eye-controlled interface manager is device 110. In an embodiment, the device is: a mobile phone, a tablet, a wearable processing device, a television, a POS terminal, a SST, an ATM, a laptop, a desktop, a digital sign, or a drive-thru terminal.

In an embodiment, multiple device cooperate to execute the eye-controlled interface manager; the devices comprising device 110 and server 120.

In an embodiment, the eye-controlled interface manager is all or some combination of:114-117 and/or 121-123.

At 210, the eye-controlled interface manager tracks yes of an individual (operator) with respect to an interface that is presented on a display of a device, which the individual is operating.

In an embodiment, at 211, the eye-based HID interface controller determines an interface element that the eyes are focused on within the interface.

In an embodiment, at 212, the eye-based HID interface controller determines a predefined movement performed by one or more of the eyes of the individual.

In an embodiment, at 213, the eye-based HID interface controller determines an angle and a direction of the eyes from video frames captured by a camera integrated within or interfaced to the device being operated by the individual.

In an embodiment of 213 and at 214, the eye-based HID interface controller maps the direction at the angle to an interface element presented within the interface on the display.

At 220, the eye-based HID interface controller determines an interface operation based on the tracking of the eyes with respect to the display and the interface presented on the display at 210.

In an embodiment, at 221, the eye-based HID interface controller determines the interface operation based on an elapsed time of a gaze of the eyes at a particular interface element presented within the interface on the display.

In an embodiment, at 222, the eye-based HID interface controller determines the interface operation based on a predefined movement of the eyes made in one or more directions based on other predefined movements of one or more eyelids of the eyes.

At 230, the eye-based HID interface controller processes the interface operation within the interface.

In an embodiment, at 231, the eye-based HID interface controller generates a HID-compliant format for the interface operation and processes the interface operation as a HID command issued from a HID device driver of the device. For example, a mouse or touch HID command is produced for the interface operation and processed with the interface as if it was issued from the mouse or touch HID driver.

In an embodiment, at 232, the eye-based HID interface controller generates an API call that instructs the interface through the API call to process the interface operation.

In an embodiment, at 240, the eye-based HID interface controller processes as a HID or a logical HID for the interface, which is controlled by gages of the eyes on interface elements presented within the interface on the display and controlled by movements of the eyes or movements of one or more eyelids of the eyes.

Figure 3:
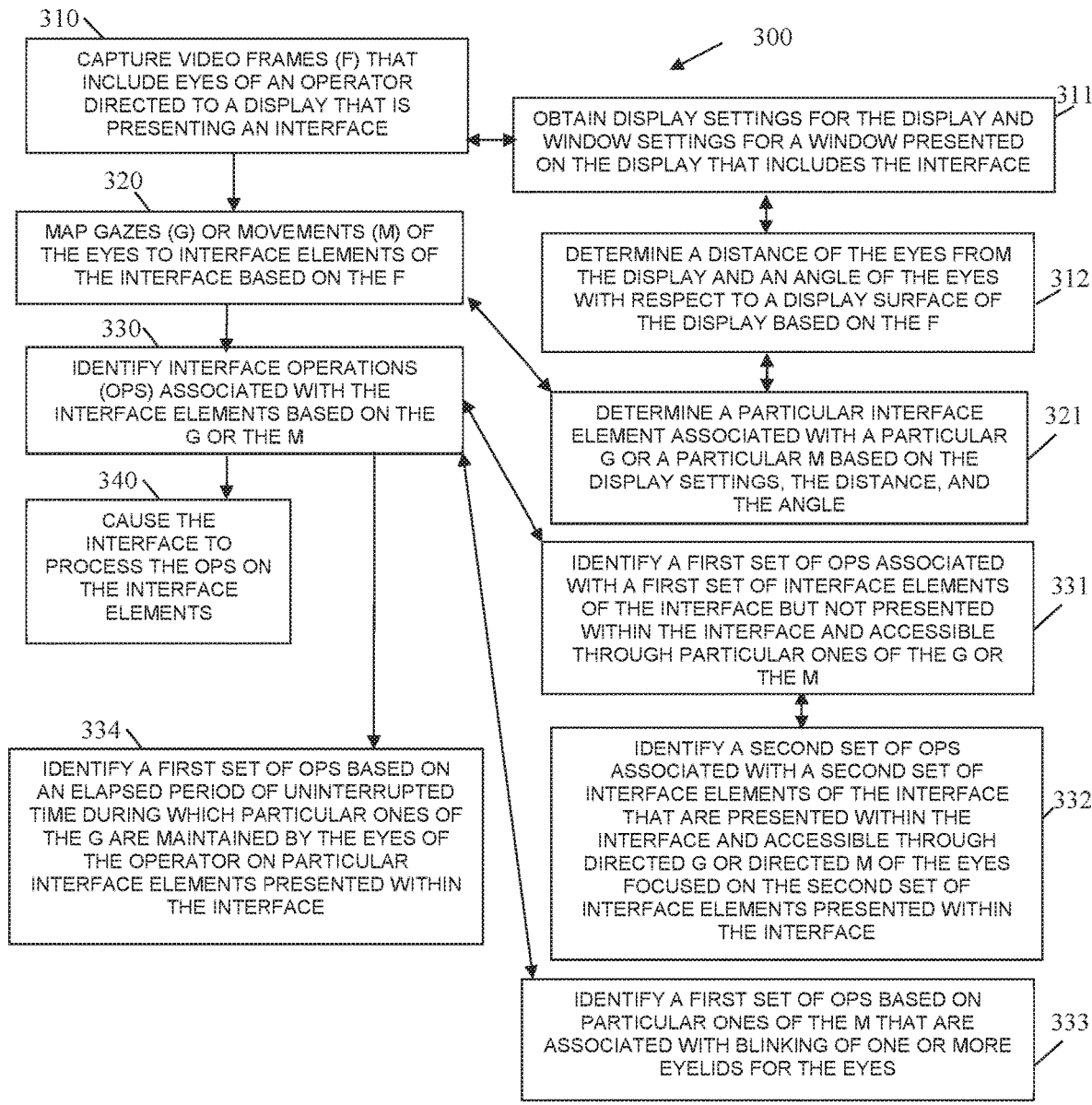
FIG. 3 is a diagram of another method for a gaze-based human interface control, according to an example embodiment.

FIG. 3 is a diagram of another method 300 for a gaze-based human interface control, according to an example embodiment. The software module(s) that implements the method 300 is referred to as an "eye-based HID interface controller." The eye-based HID interface controller is implemented as executable instructions programmed and residing within memory and/or a non-transitory computer-readable (processor-readable) storage medium and executed by one or more processors of a device. The processors that execute the eye-based HID interface controller are specifically configured and programmed to process the eye-based HID interface controller. The eye-based HID interface controller has access to one or more network connections during its processing. The network connections can be wired, wireless, or a combination of wired and wireless.

In an embodiment, the device that executes the eye-based HID interface controller is the server 120, In an embodiment, the server 120 is a cloud processing environment.

In an embodiment, the device that executes the eye-based HID interface controller is device 110. In an embodiment, device 110 is: a mobile phone, a tablet, a wearable processing device, a laptop, a desktop, a television, a digital sign, a drive-thru terminal, a POS terminal, a SST, or an ATM.

In an embodiment, multiple devices cooperate to execute the eye-based HID interface controller; the devices comprising device 110 and server 120.

In an embodiment, the eye-based HID interface controller is all of or some combination of:114-117, 121-123, and/or the method 200.

The eye-based HID interface controller presents another and, in some ways, enhanced processing perspective of the method 200 discussed above.

At 310, the eye-based HID interface controller captures video frames that include eyes of an operator directed to a display that is presenting an interface.

In an embodiment, at 311, the eye-based HID interface controller obtains display settings for the display and window settings for a window presented on the display that includes the interface.

In an embodiment, at 312, the eye-based HID interface controller determines a distance of the eyes from the display and an angle of the eyes with respect to a display surface of the display based on the video frames.

At 320, the eye-based HID interface controller maps gazes or movements of the eyes to interface elements of the interface based on the video frames.

In an embodiment of 312 and 320, at 321, the eye-based HID interface controller determines a particular interface element associated with a particular gaze or a particular movement based on the display settings, the distance, the window settings, and the angle.

At 330, the eye-based HID interface controller identifying interface operations associated with the interface elements based on the gazes or the movements.

In an embodiment, at 331, the eye-based HID interface controller identifies a first set of interface operations associated with a first set of interface elements of the interface but not presented within the interface and accessible through particular ones of the gazes or the movements. This is a case where some interface elements are not displayed and accessible through eye gazes and movements to save space within the interface, which is particularly useful for small sized displays, such a mobile phones or POS terminals and SSTs with a variety of complex interface elements that clutter the interface display.

In an embodiment of 331 and at 332, the eye-based HID interface controller identifies a second set of interface operations associated with a second set of interface elements of the interface that are presented within the interface and are accessible through directed gazes or directed movements of the eyes focused on the second set of interface elements presented within the interface. Here, the second set of interface elements are also available through HIDs associated with the device presenting the display, such as touch, mouse, etc.

In an embodiment, at 333, the eye-based HID interface controller identifies a first set of interface operations based on particular ones of the movements that are associated with blinking one or more eyelids for the eyes.

In an embodiment, at 334, the eye-based HID interface controller identifies a first set of operations based on an elapsed period of uninterrupted time during which particular ones of the gazes are maintained by the eyes of the operator on a particular interface element presented within the interface or maintained on a particular location of the interface where the particular interface element (which is not presented within the display) can be activated through the gazes.

At 340, the eye-based HID interface controller causes the interface to process the interface operations on the interface elements within the interface. This can be done through translating the interface operations to recognize HID controls (such as a mouse or touch controller) and making it appear as if the interface operations initiated with a HID known to the interface. In another case, an API can be used to cause the interface to process the interface operation.

Figure 4:
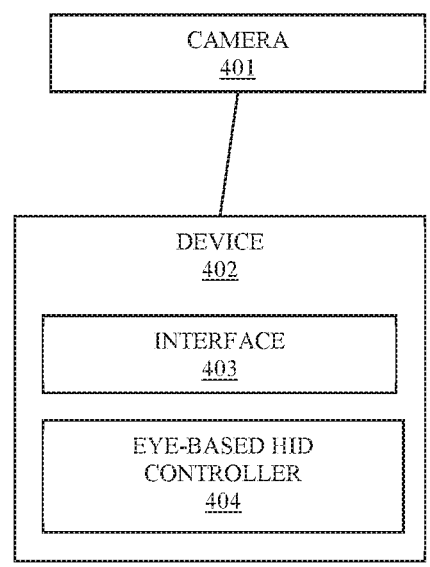
FIG. 4 is a diagram of another system for a gaze-based human interface control, according to an example embodiment.

FIG. 4 is a diagram of another system 400 for gaze-based human interface controls, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes at least one camera 401 and a device 402. The device 402 includes at least one hardware processor and a non-transitory computer-readable storage medium comprising executable instructions representing an interface 403 and an eye-based HID controller 404 for the interface 403.

The camera 401 may be integrated into the device 402 or interfaced to the device 402 over a wired or wireless interface connection port.

The eye-based HID controller 404 when executed by the processor of the device 402 from the non-transitory computer-readable storage medium causes the processor to perform processing comprising: 1) tracking gazes of the eyes, movements of the eyes, and second movements of eyelids of the eyes from the video frames captured by the at least one camera 401; 2) mapping the gazes, the movements, and the second movements to interface elements associated with the interface 403 that is presented on a display of the device 402; 3) determining interface operations associated with the interface elements and recognized by the interface 403; and 4) processing the interface operations with the interface 403 to control the interface based on the gazes, the movements, and the second movements.

In an embodiment, the device 402 is one of: a mobile phone, a wearable processing device, a Self-Service Terminal (SST), a Point-Of-Sale (POS) terminal, an Automated Teller Machine (ATM), a laptop, a desktop, a digital sign, a television, or a drive-thru terminal.

In an embodiment, the eye-based HID controller is all of or some combination of:114-117, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive, Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   tracking eyes of an individual with respect to an interface presented on a display of a device, wherein tracking further includes identifying window identifiers for each window presented within the display and identifying a topmost left corner coordinate pixel pair for each window presented within the display;
   determining an interface operation based on the tracking;
   processing the interface operation within the interface using the window identifiers and topmost left corner coordinate pixel pairs for the windows; and
   processing the method as a logical Human-Interface Device (HID) without modification to the interface that is an existing interface.

2. The method of claim 1, wherein tracking further includes determining an interface element that the eyes are focused on within the interface.

3. The method of claim 1, wherein tracking further includes determining a predefined movement performed by one or more of the eyes.

4. The method of claim 1, wherein tracking further includes determining an angle and a direction of the eyes from video frames captured by a camera interfaced to the device.

5. The method of claim 4, wherein determining the angle and the direction further includes mapping the direction at the angle to an interface element presented within the interface on the display.

6. The method of claim 1, determining further includes determining the interface option based on an elapsed time of a gaze of the eyes at a particular interface element presented within the interface on the display.

7. The method of claim 1, wherein determining further includes determining the interface option based on a predefined movement of the eyes made in one or more directions or based on other predefined movements of one or more eyelids of the eyes.

8. The method of claim 1, wherein processing the method further includes generating a HID-compliant format for the interface operation and processing the interface operation as a HID command issued from a HID device driver of the device.

9. The method of claim 1, wherein processing the method further includes processing the logical HID for the interface being controlled by gazes of the eyes on interface elements presented within the interface on the display and controlled by movements of the eyes or movements of one or more eyelids of the eyes.

10. A method, comprising:
    capturing video frames including eyes of an operator directed to a display that is presenting an interface;
    mapping gazes or movements of the eyes to interface elements of the interface based on the video frames;
    identifying interface operations associated with the interface elements based on the gazes or the movements, wherein identifying further includes identifying window identifiers for each window presented within the display and identifying a topmost left corner coordinate pixel pair for each window presented within the display;
    causing the interface to process the interface operations on the interface elements using the window identifiers and the topmost left coordinate pixel pairs for the windows; and
    processing the method as a logical Human-Interface Device (HID) without modification to the interface that is an existing interface.

11. The method of claim 10, wherein capturing further includes obtaining display settings for the display and window settings for the windows a window presented on the display, the windows include that includes the interface.

12. The method of claim 11, wherein obtaining further includes determining of distance of the eyes from the display and an angle of the eyes with respect to a display surface of the display based on the video frames.

13. The method of claim 12, wherein mapping further includes determining a particular interface element associated with a particular gaze or a particular movement based on the display settings, the distance, and the angle.

14. The method of claim 10, wherein identifying further includes identifying a first set of interface operations associated with a first set of interface elements of the interface but not presented within the interface and accessible through particular ones of the gazes or the movements.

15. The method of claim 11, wherein identifying further includes identifying a second set of interface operations associated with a second set of interface elements of the interface that are presented within the interface and accessible through directed gazes or directed movements of the eyes focused on the second set of interface elements presented within the interface.

16. The method of claim 10, wherein identifying further includes identifying a first set of interface operations based on particular ones of the movements that are associated with blinking of one or more eyelids for the eyes.

17. The method of claim 10, wherein identifying further includes identifying a first set of interface operations based on an elapsed period of uninterrupted time during which particular ones of the gazes are maintained by the eyes of the operator on particular interface elements presented within the interface.

18. A system, comprising:
- at least one camera configured to capture video frames comprise eyes of an operator of a device;
- the device comprising:
    - a processor and non-transitory computer-readable storage medium having executable instructions representing an interface and an eye-based Human Interface Device (HID) controller for the interface;
    - the eye-based HID controller when executed by the processor from the non-transitory computer-readable storage medium causes the processor to perform processing comprising:
        - tracking gazes of the eyes, movements of the eyes, and second movements of eyelids of the eyes from the video frames captured by the at least one camera;
        - mapping the gazes, the movements, and the second movements to interface elements associated with the interface that is presented on a display of the device, wherein mapping further includes identifying window identifiers for each window presented within the display and identifying a topmost left corner coordinate pixel pair for each window presented within the display;
        - determining interface operations associated with the interface elements and recognized by the interface;
        - processing the interface operations with the interface to control the interface based on the gazes, the movements, and the second movements using the window identifiers and the topmost left corner coordinate pixel pairs for the windows; and
        - processing the interface and an eye-based Human Interface Device (HID) controller as a logical Human-Interface Device (HID) without modification to the interface that is an existing interface.

19. The system of claim 18, wherein the device is: a mobile phone, a wearable processing device, a tablet, a Self-Service Terminal (SST), a Point-Of-Sale (POS) terminal, an Automated Teller Machine (ATM), a laptop, a desktop, a digital sign, a television, or a drive-thru terminal.

* * * * *